(12) United States Patent
Hosoda

(10) Patent No.: US 8,587,822 B2
(45) Date of Patent: Nov. 19, 2013

(54) PRINTING APPARATUS, METHOD AND STORAGE MEDIUM FOR EXECUTING A JOB COMBINING DOUBLE-SIDED AND SINGLE-SIDED PAGES

(75) Inventor: Osamu Hosoda, Inagi (JP)

(73) Assignee: Canon Kabushiki Kaisha, Tokyo (JP)

( * ) Notice: Subject to any disclaimer, the term of this patent is extended or adjusted under 35 U.S.C. 154(b) by 52 days.

(21) Appl. No.: 13/256,481

(22) PCT Filed: Jun. 20, 2011

(86) PCT No.: PCT/JP2011/064612
§ 371 (c)(1),
(2), (4) Date: Dec. 9, 2011

(87) PCT Pub. No.: WO2012/002295
PCT Pub. Date: Jan. 5, 2012

(65) Prior Publication Data
US 2012/0320424 A1 Dec. 20, 2012

(30) Foreign Application Priority Data
Jul. 1, 2010 (JP) ................. 2010-151228

(51) Int. Cl.
*G06K 15/00* (2006.01)
*G06K 1/00* (2006.01)
*G06F 3/12* (2006.01)
*G06F 15/00* (2006.01)

(52) U.S. Cl.
USPC .......................... 358/1.18; 358/1.13; 358/1.9

(58) Field of Classification Search
None
See application file for complete search history.

(56) References Cited

U.S. PATENT DOCUMENTS

| 5,038,182 | A | 8/1991 | Tanimoto |
| 6,728,499 | B2 * | 4/2004 | Ushio et al. ..................... 399/75 |
| 8,023,133 | B2 * | 9/2011 | Kaneko ......................... 358/1.15 |
| 2003/0202201 | A1 * | 10/2003 | Muto et al. .................... 358/1.14 |
| 2004/0066535 | A1 * | 4/2004 | Oyumi ......................... 358/1.15 |
| 2006/0263109 | A1 * | 11/2006 | Murata .......................... 399/82 |
| 2007/0106987 | A1 * | 5/2007 | Makino ......................... 718/100 |
| 2007/0245354 | A1 * | 10/2007 | Tomita .......................... 719/318 |
| 2009/0080001 | A1 | 3/2009 | Ueda et al. |
| 2010/0091311 | A1 * | 4/2010 | Sato et al. ..................... 358/1.12 |

(Continued)

FOREIGN PATENT DOCUMENTS

| JP | 5-72854 A | 3/1993 |
| JP | 9-230637 A | 9/1997 |

(Continued)

*Primary Examiner* — Ming Hon
(74) *Attorney, Agent, or Firm* — Fitzpatrick, Cella, Harper & Scinto

(57) ABSTRACT

To effectively output a job in which a double-sided page and a single-sided page are mixed by using a double-sided conveying path and a single-sided conveying path or the single-sided conveying path, a method for controlling a printing apparatus comprises: specifying a print prediction time in a case where the job is executed by using a first printing process of printing the double-sided page and the single-sided page in the job by using the double-sided conveying path, and a print prediction time in a case where the job is executed by using a second printing process of printing the double-sided page and the single-sided page in the job by switching between the double-sided conveying path and the single-sided conveying path; and executing the job by using, from either the first printing process or the second printing process, the printing process for which the specified print prediction time is shorter.

6 Claims, 11 Drawing Sheets

(56) References Cited

U.S. PATENT DOCUMENTS

| | | |
|---|---|---|
| 2010/0110483 A1 | 5/2010 | Igarashi |
| 2010/0296831 A1* | 11/2010 | Sakai .............................. 399/85 |
| 2011/0236044 A1* | 9/2011 | Kim et al. ....................... 399/44 |

FOREIGN PATENT DOCUMENTS

| | | |
|---|---|---|
| JP | 11-277849 A | 10/1999 |
| JP | 2004-145218 A | 5/2004 |
| JP | 2005-103994 A | 4/2005 |

* cited by examiner

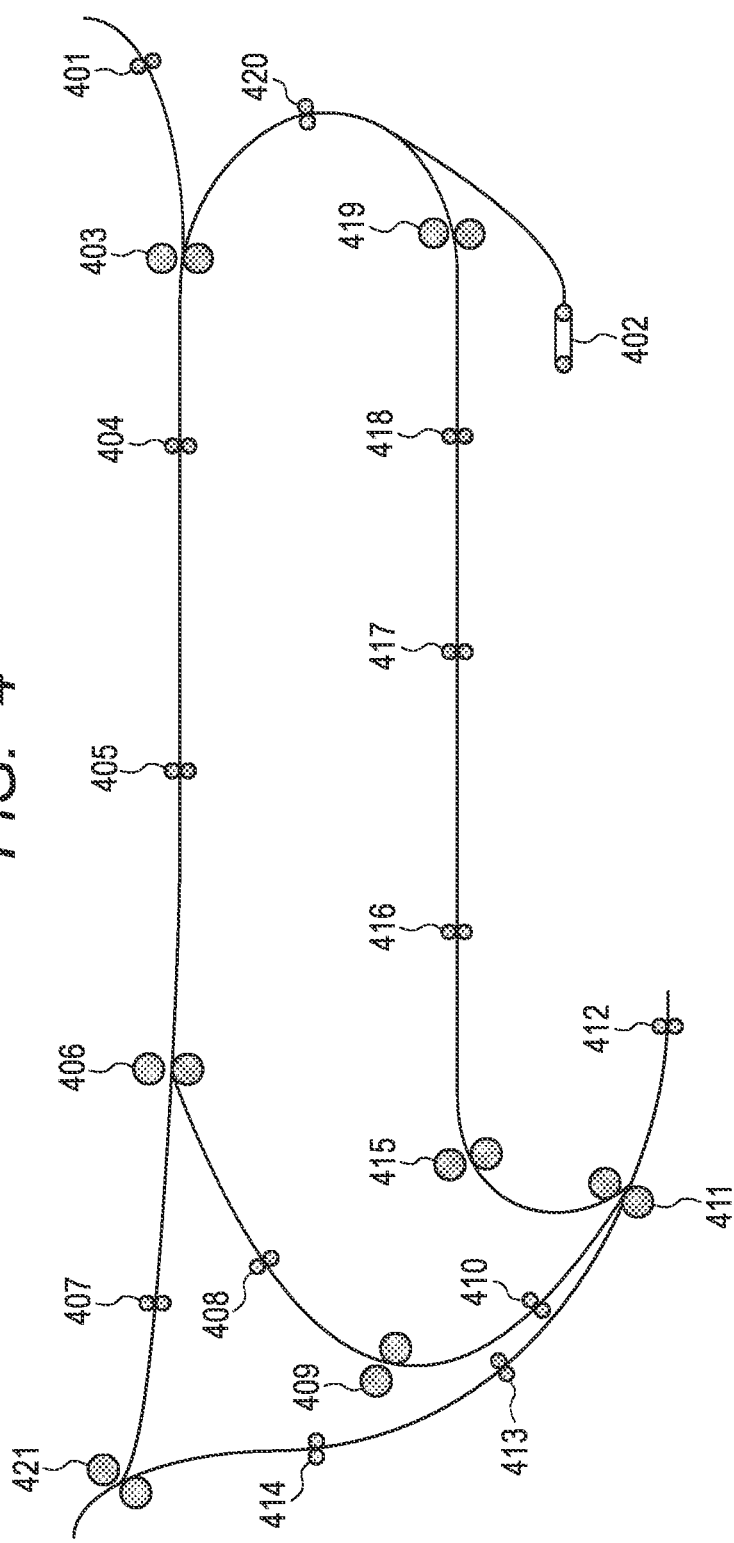

| ID | START PAGE | END PAGE | CONVEYING METHOD |
|---|---|---|---|
| 001 | 0001 | 0004 | DOUBLE-SIDED |
| 002 | 0005 | 0014 | SINGLE-SIDED |
| 003 | 0015 | 0021 | MIX OF DOUBLE-SIDED AND SINGLE-SIDED |
| 004 | 0022 | ... | ... |
| 005 | ... | ... | ... |

PRINTING APPARATUS, METHOD AND STORAGE MEDIUM FOR EXECUTING A JOB COMBINING DOUBLE-SIDED AND SINGLE-SIDED PAGES

TECHNICAL FIELD

The present invention relates to a printing apparatus, a controlling method of the printing apparatus, and a storage medium of storing a computer program to execute the controlling method.

BACKGROUND ART

Conventionally, in a case where a printing medium that printing is performed on its one side and a printing medium that printing is performed on its both sides are continuously output, it has been known to use a printing apparatus to which a controlling method of outputting these media by switching between a single-sided conveying route for single-sided printing and a double-sided conveying route for double-sided printing is applied.

On the other hand, it has been also known to use a printing apparatus to which a controlling method of outputting the printing medium that the printing is performed on its one side and the printing medium that the printing is performed on its both sides through an identical conveying route is applied (for example, see PTL 1).

In each of the printing apparatuses constituted as described above, there are following problems when a single-sided page that an image has been formed on its one side and a double-sided page that images have been formed respectively on its both sides are continuously output. That is, superiority or inferiority between an output time for outputting the single-sided pages and the double-sided pages by properly switching between the single-sided conveying route and the double-sided conveying route and an output time for outputting the single-sided pages and the double-sided pages through only the double-sided conveying route depends on a combination of the single-sided pages and the double-sided pages in a job to be output and a characteristic of the apparatus itself.

Therefore, it is not easy for an operator of the printing apparatus to select, from the above two controlling methods, the one controlling method by which the output time is shorter in regard to the job in which the single-sided pages and the double-sided pages are complicatedly combined with others.

Moreover, it is impossible in the background art to perform the printing while switching between the above two controlling methods in regard to fragmentary page groups included in the job. Therefore, when tendencies of combinations of the single-sided pages and the double-sided pages are fragmentarily different, output speed partially slows down.

CITATION LIST

Patent Literature
PTL 1: Japanese Patent Application Laid-Open No. H11-277849

SUMMARY OF INVENTION

The present invention, which has been completed to solve the above-described problems, aims to provide a printing apparatus which can execute a job in which a double-sided page and a single-sided page are mixed, by switching between a double-sided conveying path and a single-sided conveying path, the apparatus comprising: a specifying unit configured to specify a print prediction time in a case where the job is executed by using a first printing process of printing the double-sided page and the single-sided page in the job by using the double-sided conveying path, and a print prediction time in a case where the job is executed by using a second printing process of printing the double-sided page and the single-sided page in the job by switching between the double-sided conveying path and the single-sided conveying path; and a control unit configured to execute the job by using, from either the first printing process or the second printing process, the printing process for which the print prediction time specified by the specifying unit is shorter.

Further features of the present invention will become apparent from the following description of exemplary embodiments with reference to the attached drawings.

BRIEF DESCRIPTION OF DRAWINGS

FIG. 4 is a diagram illustrating a route for conveying a printing medium in the printing apparatus.

DESCRIPTION OF EMBODIMENTS

Hereinafter, preferred embodiments of the present invention will be described with reference to the attached drawings.

First Embodiment

Figure 1:
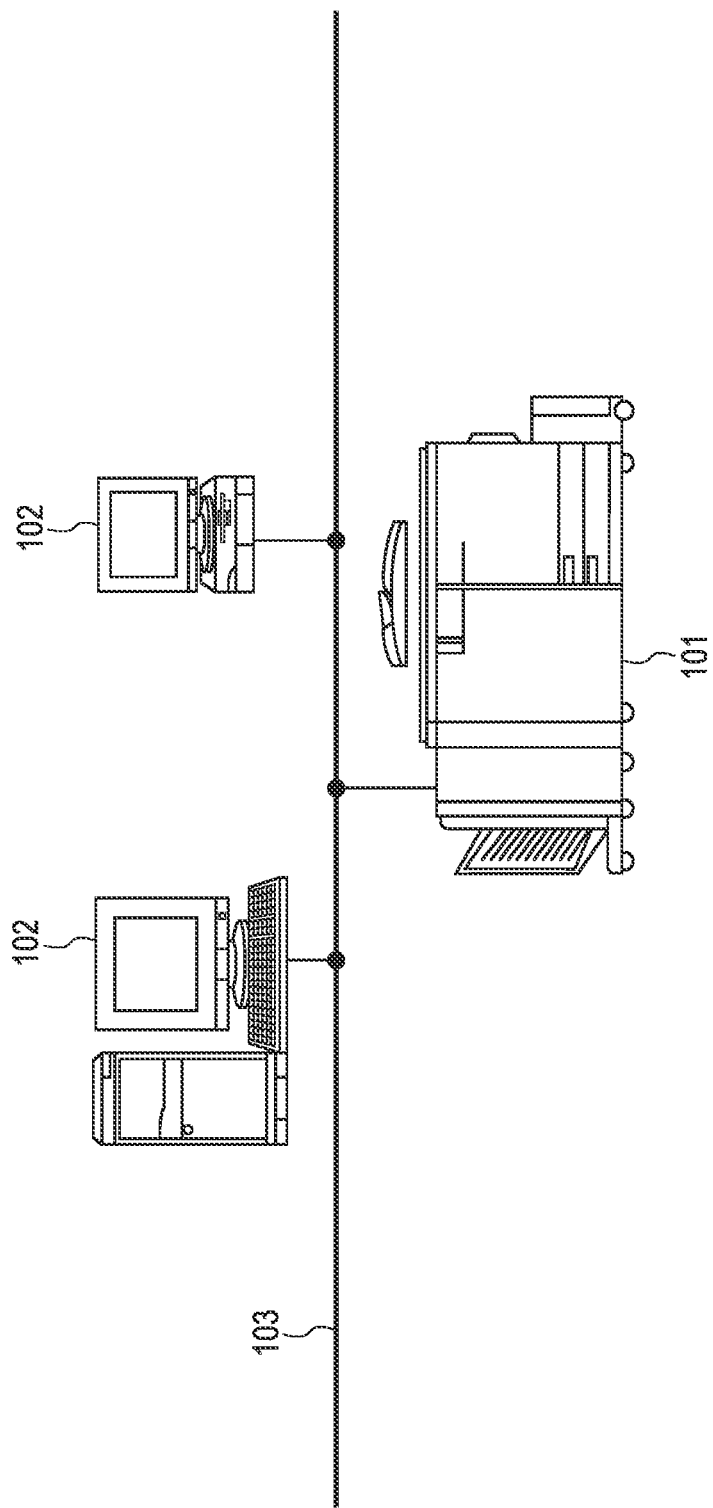
FIG. 1 is a block diagram illustrating a configuration of a printing system which includes a printing apparatus.
Figure 2:
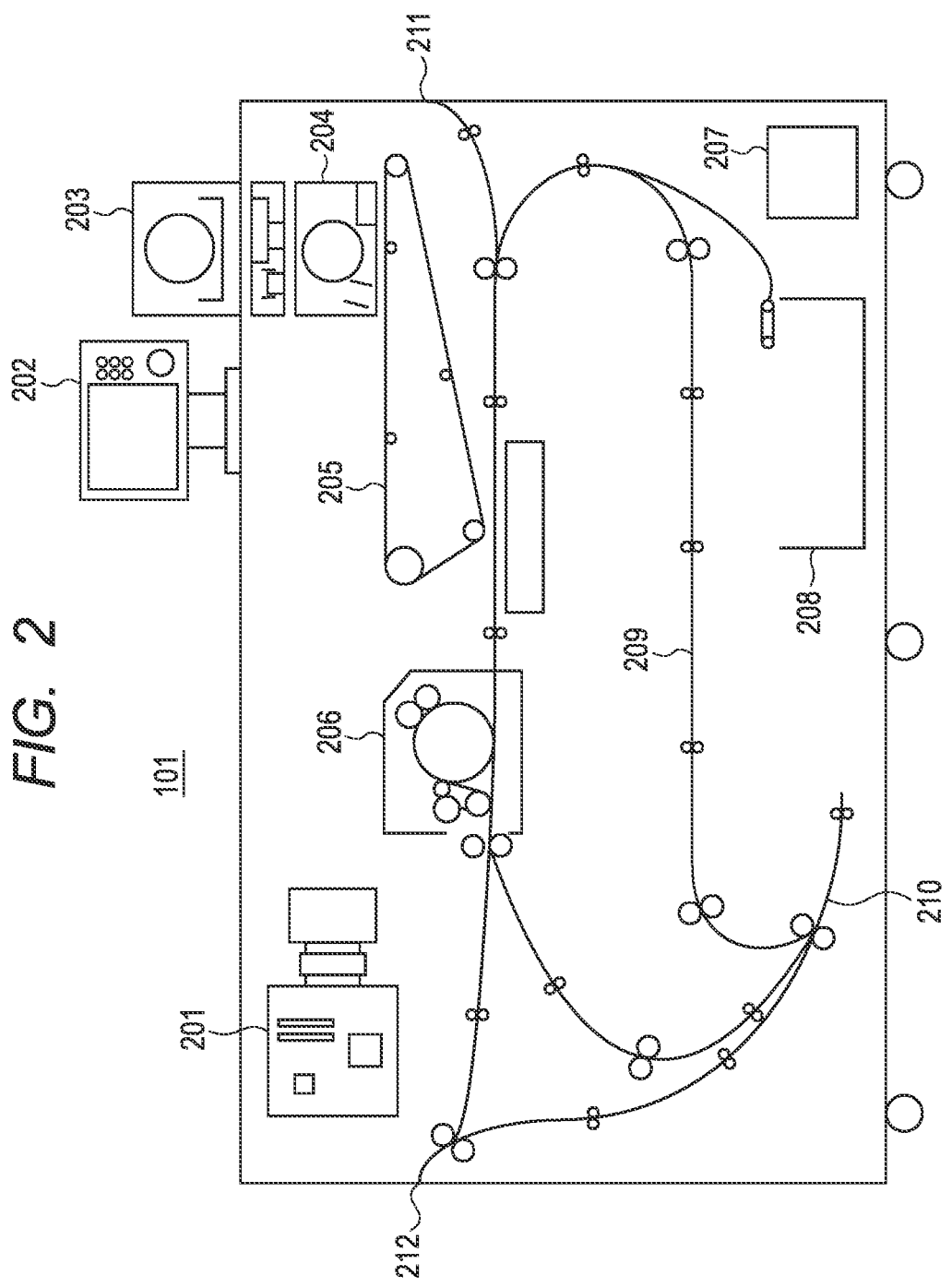
FIG. 2 is a block diagram illustrating a constitution of the printing apparatus illustrated in FIG. 1.

FIG. 1 is a block diagram illustrating a configuration of a printing system which includes a printing apparatus according to the present embodiment. In the present embodiment, as illustrated in FIG. 2, the printing apparatus which can print a job in which a double-sided page that images have been formed respectively on its both sides and a single-sided page that an image has been formed on its one side are mixed, by properly switching between a double-sided conveying path to be used for double-sided printing and a single-sided conveying path to be used for single-sided printing.

The printing system illustrated in FIG. 1 includes a printing apparatus 101 and host computers (PCs) 102. In the PC 102, a printer driver or the like for transmitting print data to the printing apparatus 101 through a network 103 has been installed.

The PC 102 has not only a function to transmit the print data but also a function to perform an image editing process by operating an image processing application.

The network 103 is used to communicably connect the printing apparatus 101 and the PC 102 to each other using a predetermined protocol, whereby a mutual communication process is performed therebetween.

In the printing system according to the present embodiment, the printing apparatus 101 forms an image by using the print data received from the PC 102.

FIG. 2 is a block diagram illustrating the constitution of the printing apparatus 101 illustrated in FIG. 1.

In FIG. 2, a control unit 201 operates software to perform various control operations to the printing apparatus 101, an operation unit 202 issues various operation instructions to the printing apparatus 101, and a toner supplying unit 203 supplies a toner which serves as a printing agent to an image forming unit of the printing apparatus 101. Here, the toner supplying unit 203 is equipped with a cap through which an operator can supply the toner.

An image forming unit 204 forms the image which is instructed by the print data, with use of the toner supplied from the toner supplying unit 203, and then transfers the formed image to an intermediate transfer belt 205. Subsequently, the image transferred to the intermediate transfer belt 205 is further transferred to a printing medium (also called a sheet or a print medium) such as a paper or the like.

A fixing unit 206 applies heat and pressure to the printing medium on which the image has been transferred through the intermediate transfer belt 205, thereby fixing the toner to the printing medium.

In a residual toner collecting unit 207, the toners which were not transferred to the printing medium on the intermediate transfer belt 205 are accumulated.

A paper feeding unit 208 is used to supply the printing media. The printing medium which is supplied from the paper feeding unit 208 is conveyed by a printing medium conveying unit 209, and then the toner is transferred and fixed to the conveyed printing medium.

A switchback unit 210 is used to once stop the conveyed printing medium, and again draw the conveyed printing medium into the printing medium conveying unit. A printing medium input slot 211, which is provided so that the printing medium can be input from an external paper feeding device, serves as a so-called manual paper feeding unit. A printing medium discharging unit 212 discharges the conveyed printing medium to which the image has been fixed to an external output device.

Figure 3:
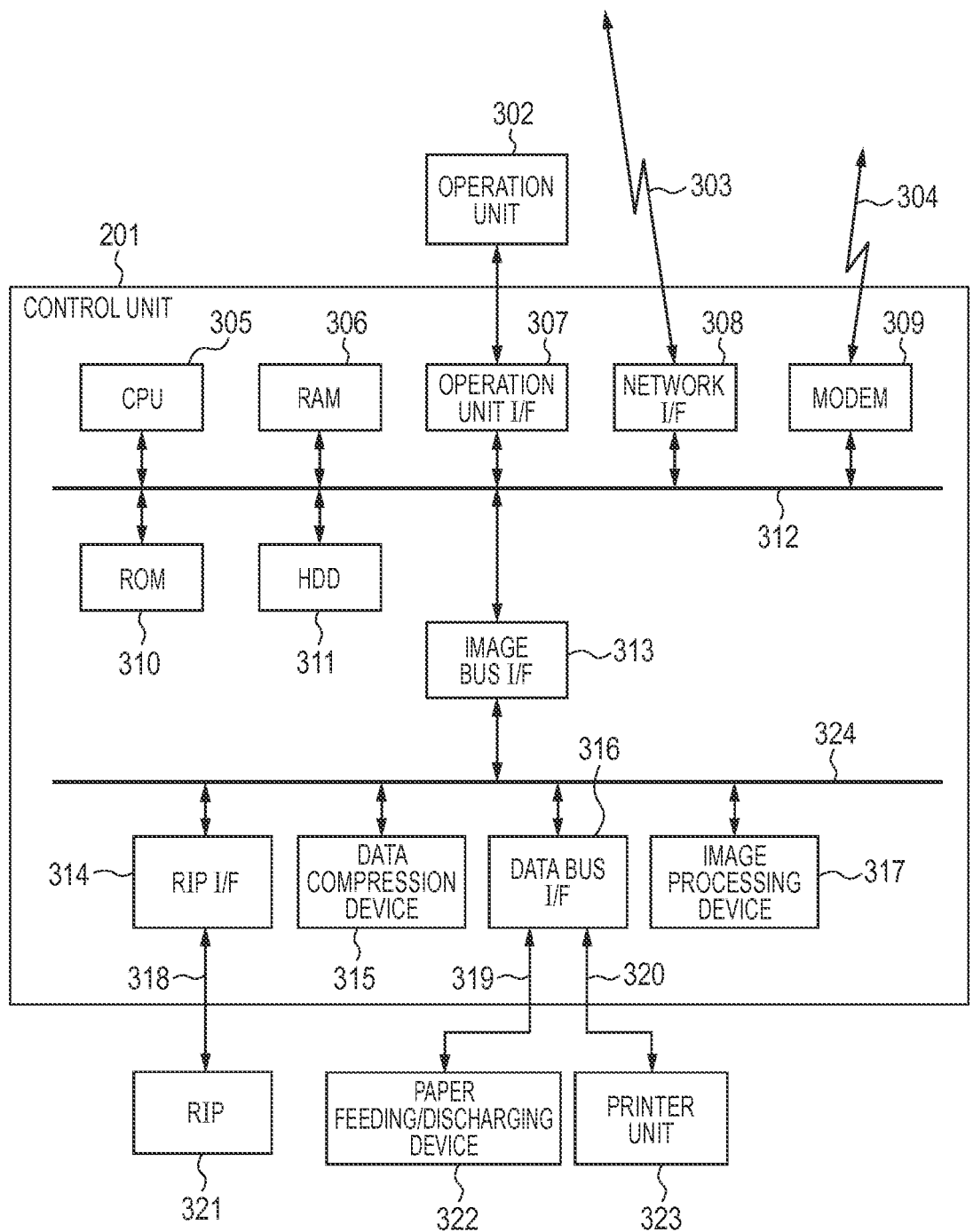
FIG. 3 is a block diagram illustrating a constitution of a control unit which is provided in the printing apparatus illustrated in FIG. 1.

FIG. 3 is a block diagram illustrating the constitution of the control unit 201 which is provided in the printing apparatus 101 illustrated in FIG. 1.

In FIG. 3, the control unit 201 controls the printing apparatus 101 entirely, and an operation unit 302 is used to operate the printing apparatus 101.

A network cable 303 is used to connect to an external device through a network.

A line cable 304 is used to connect to an external device through a telephone line. A CPU 305 controls the printing apparatus 101 entirely. For example, the CPU 305 can operate a program for controlling the control unit 201 entirely, and execute a print job accepted from the PC 102. A RAM (random access memory) 306 is managed based on the program operating on the CPU 305. More specifically, the RAM 306 is used as a reception buffer for temporarily storing externally received data, an image data buffer for temporarily storing image data rasterized by an RIP (raster image processor), and the like.

An operation unit I/F (interface) 307 is used to connect the operation unit 302 and the control unit 201 to each other, a network I/F 308 is used to connect the control unit 201 and the network to each other, and a modem 309 is used to connect the control unit 201 and the telephone line to each other.

A ROM (read only memory) 310 stores therein the programs operating on the CPU 305, data and the like, and an HDD (hard disk drive) 311 is a nonvolatile storage device which can store therein various data for a long time. Also, a CPU bus 312 is provided in the control unit.

An image bus 324 is connected to a hardware group for performing various image processes, and an image bus I/F 313 is used to connect the CPU bus 312 and the image bus 324 to each other. An RIP 321, which is also called a rasterizing board, converts externally input image description data into bitmap image data.

A RIP I/F 314 is used to connect the RIP 321 and the image bus 324 to each other through an image transfer bus 318. A data compression device 315 performs a compression process to image data according to a predetermined compression format. Here, plural kinds of compression formats such as a JPEG (Joint Photographic Experts Group) format and the like can be applied as the predetermined compression format.

A paper feeding/discharging device 322 performs a paper feeding process and a paper discharging process, and a printer unit 323 performs various printing processes. A conveying route in the printer unit 323 will be described later with reference to FIG. 4.

A data bus I/F 316 is used to connect the printer unit 323 and the paper feeding/discharging device 322 to the image bus 324 respectively through data buses 320 and 319. An image processing device (image processing unit) 317 performs various image processes to the bitmap image data generated by the RIP 321. More specifically, the image processing device (image processing unit) 317 has a function to perform a digital layout process to the bitmap image data, such as a so-called 2-in-1 function to merge the bitmap image data of two pages into the bitmap image data of one page.

The CPU 305 performs the printing, while issuing print instructions to the printer unit 323 and the paper feeding/discharging device 322 respectively through the data buses 320 and 319, in response to a signal input from the operation unit 302 or the external device through the network cable 303.

FIG. 4 is a diagram illustrating a route for conveying the printing medium in the printing apparatus 101 illustrated in FIG. 2.

The route illustrated in FIG. 4 includes a slot 401 through which the printing medium is inserted from the external device into the printing medium conveying route and a slot 402 through which the printing medium is inserted from the paper feeding unit 208 into the printing medium conveying route.

The route further includes a discharge slot 421 through which the printing medium is discharged from the printing medium conveying route to the external device, and printing medium conveying rollers (hereinafter, called conveying rollers) 403, 404, 405, 406, 407, 408, 409, 410, 411, 412, 413, 414, 415, 416, 417, 418, 419 and 420 which are provided on the conveying route for conveying the printing medium.

Driving of each of the conveying rollers 403 to 420 is independently controlled according to the conveying route of the printing medium.

When the printing is performed on only the single side of the printing medium and then the printing medium is discharged with the print surface upward, the CPU 305 controls to drive the conveying rollers 403, 404, 405, 406, 407 and 421 in this order to convey the printing medium. Incidentally, although the CPU 305 controls the driving of the conveying rollers in the present embodiment, it may be controlled to provide own CPU in the printer unit 323 so that the CPU of the printer unit 323 controls the driving of the conveying rollers by receiving a print instruction from the CPU 305 of the control unit 201. It should be noted that this is also applicable to the following descriptions.

When the printing is performed on only the single side of the printing medium and then the printing medium is discharged with the print surface downward, the CPU controls to drive the conveying rollers 403, 404, 405, 406, 408, 409, 410, 411, 412, 411, 413, 414 and 421 in this order to convey the printing medium.

When the printing is performed on the two sides of the printing medium, the CPU controls to drive the conveying rollers 403, 404, 405, 406, 408, 409, 410, 411, 412, 411, 415, 416, 417, 418, 419, 420, 403, 404, 405, 406, 407 and 421 in this order to convey the printing medium.

Incidentally, the portion of the conveying route including the conveying rollers 411 and 412 is the portion by which the printing medium is switched back, and this portion may be controlled by reversing the conveying rollers. Further, each of the conveying rollers 406 and 411 has a mechanism (flapper) for switching the conveying path to convey the printing medium.

The number of the printing media which can simultaneously exist on the conveying route in the case where only the double-sided printing is performed may be different from that in the case where the double-sided printing and the single-sided printing are mixedly performed. Basically, since the number of the printing media which can simultaneously exist on the conveying route in the case where the double-sided printing and the single-sided printing are mixedly performed is smaller than that in the case where only the double-sided printing is performed, a printing throughput in the case where the double-sided printing and the single-sided printing are mixedly performed tends to reduces.

Further, when the single-sided printing and the double-sided printing are switched, such switching may take an extra time, whereby there is a case where a printing throughput reduces.

The former printing throughput can be calculated by using a ratio of the reduction of the throughput in the single-sided printing and the reduction of the throughput in the double-sided printing. Further, the latter printing throughput can be calculated by using a value obtained by multiplying the number of occurrence of the switching between the single-sided printing and the double-sided printing by a time necessary for the switching.

In the following, an example of a method of calculating a printing time according to a feature of the job and a characteristic of the printing apparatus will be described.

That is, it is assumed that the feature of the job includes:
the number of papers (Sp) necessary for the printing of the single-sided pages included in the job;
the number of papers (Dp) necessary for the printing of the double-sided pages included in the job;
the number of times of the switching (SDc) from the single-sided printing to the double-sided printing to be performed by the execution of the job; and
the number of times of the switching (DSc) from the double-sided printing to the single-sided printing to be performed by the execution of the job.

Further, it is assumed that the characteristic of the printing apparatus includes:
a printing time (St) for each of the single-sided pages;
a printing time (Dt) for each of the double-sided pages;
a switching time (SDt) for switching from a single-sided mode to a double-sided mode;
a switching time (DSt) for switching from the double-sided mode to the single-sided mode;
a decreasing rate (Sa) of the printing time for each of the single-sided pages in the case where the single-sided pages and the double-sided pages are mixed.
a decreasing rate (Da) of the printing time for each of the double-sided pages in the case where the single-sided pages and the double-sided pages are mixed.

In this case, the printing time is calculated according to the feature of the job and the characteristic of the printing apparatus, as indicated below. Here, the reason why the printing time for each of the single-sided pages and the printing time for each of the double-sided pages decrease in the case where the single-sided pages and the double-sided pages are mixed is that the identical switchback unit 210 is used in both the single-sided printing and the double-sided printing. That is, since the papers to be handled in both the single-sided printing and the double-sided printing pass through the identical switchback unit 210, it is necessary to perform the printing with a certain interval between the paper handled in the single-sided printing and the paper handled in the double-sided printing so that these papers do not collide with each other in the switchback unit 210. Although the decreasing rate is different generally according to the constitution of the paper conveying path, this rate is determined by the interval between the paper handled in the single-sided printing and the paper handled in the double-sided printing so that these papers do not collide with each other in the switchback unit 210. Namely, the decreasing rate increases as the provided interval increases.

The time which is necessary to perform the printing by switching between the one-sided printing and the double-sided printing is calculated by the formula (Sp×St)×Sa+(Dp×Dt)×Da+(SDc×SDt)+(DSc×DSt).

Further, the time which is necessary to perform the printing by conveying all the printing media on the double-sided conveying route is calculated by the formula (Dp+Sp)×Dt.

Figure 5A:
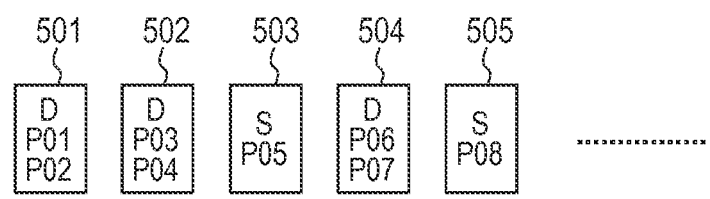
FIG. 5A is a diagram for describing a conveying state of the printing media in the printing apparatus.
Figure 5B:
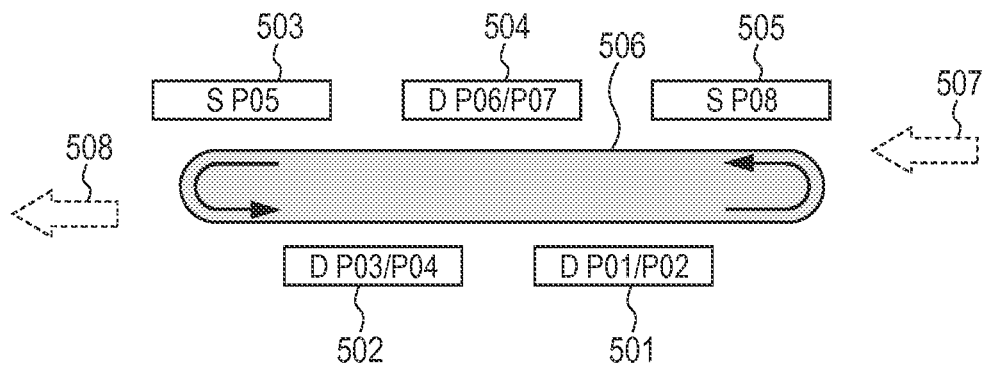
FIG. 5B is a diagrams for describing a conveying state of the printing media in the printing apparatus.
Figure 6A:
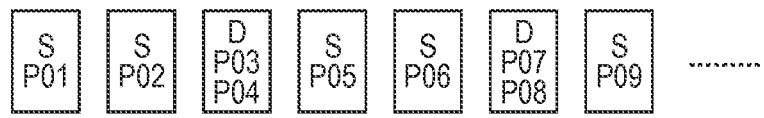
FIG. 6A is a diagram for describing a conveying state of the printing medium in the printing apparatus.
Figure 6B:
FIG. 6B is a diagram for describing a conveying state of the printing medium in the printing apparatus.
Figure 6C:
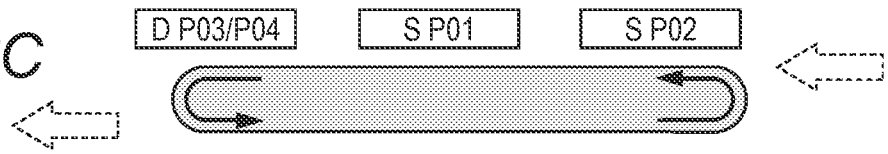
FIG. 6C is a diagram for describing a conveying state of the printing medium in the printing apparatus.
Figure 6D:
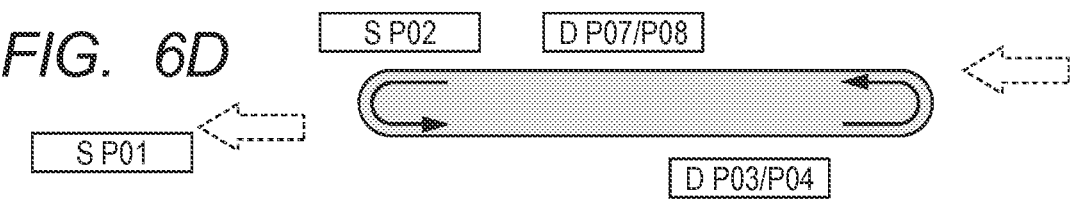
FIG. 6D is diagram for describing a conveying state of the printing medium in the printing apparatus.
Figure 6E:
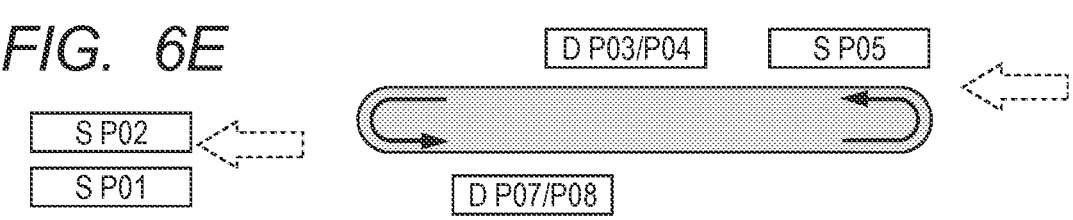
FIG. 6E is a diagram for describing a conveying state of the printing medium in the printing apparatus.
Figure 6F:
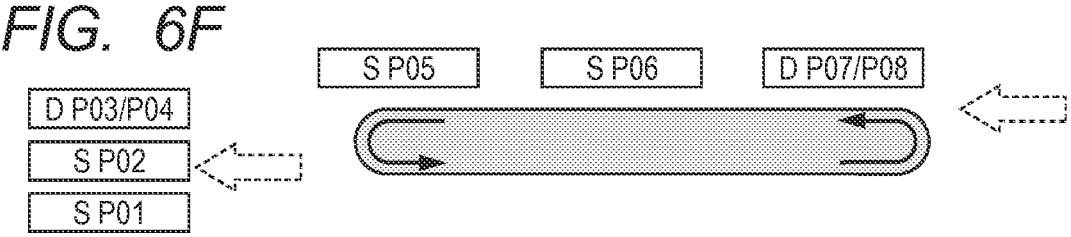
FIG. 6F is a diagram for describing a conveying state of the printing medium in the printing apparatus.
Figure 7A:
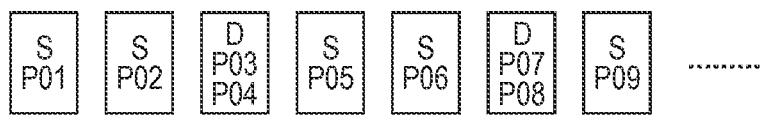
FIG. 7A is a diagram for describing a conveying state of the printing medium in the printing apparatus.
Figure 7B:
FIG. 7B is a diagram for describing a conveying state of the printing medium in the printing apparatus.
Figure 7C:
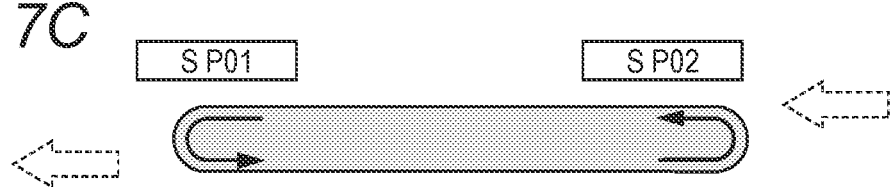
FIG. 7C is a diagram for describing a conveying state of the printing medium in the printing apparatus.
Figure 7D:
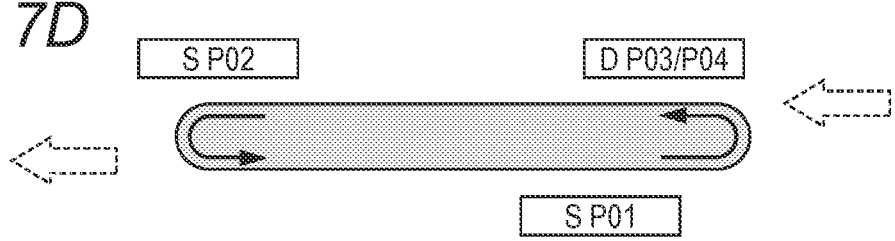
FIG. 7D is a diagram for describing a conveying state of the printing medium in the printing apparatus.
Figure 7E:
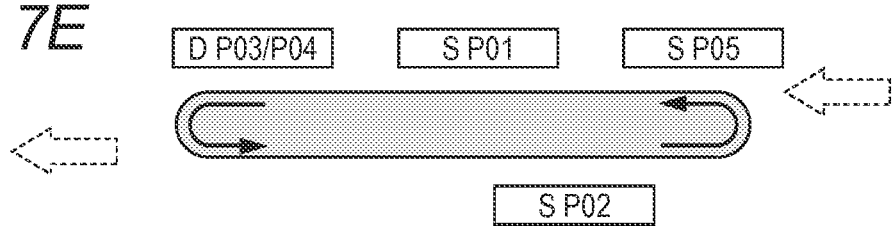
FIG. 7E is a diagram for describing a conveying state of the printing medium in the printing apparatus.
Figure 7F:
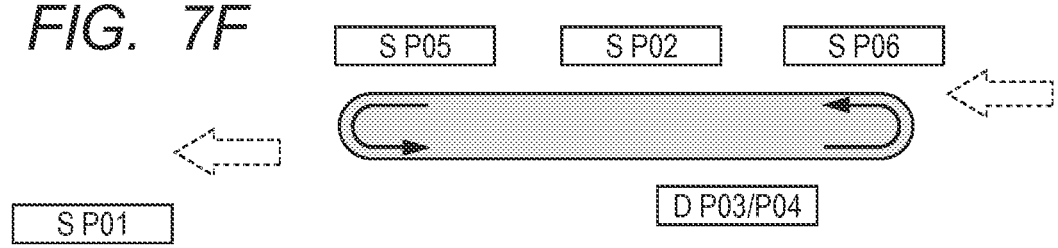
FIG. 7F is a diagram for describing a conveying state of the printing medium in the printing apparatus.

FIGS. 5A and 5B are diagrams for describing a conveying state of the printing media on the printing medium conveying route in the printing apparatus 101 illustrated in FIG. 2.

More specifically, FIG. 5A indicates kinds and the number of printing media. Namely, the double-sided printing is performed to each of printing media 501, 502 and 504, and the single-sided printing is performed to each of printing media 503 and 505.

FIG. 5B indicates positions of the printing media on a simplified printing medium conveying route 506.

Here, it is assumed in the present embodiment that the number of the printing media which can simultaneously exist on the printing medium conveying route is five in case of the double-sided printing and three in case of the single-sided printing.

Further, the conveying route includes an input slot 507 through which the printing medium is input, and a discharge slot 508 through which the printing medium is discharged.

Subsequently, a method of controlling the concrete printing medium conveying will be described with reference to FIGS. 6A to 6F and FIGS. 7A to 7F.

Namely, FIGS. 6A to 6F and FIGS. 7A to 7F are the diagrams for describing the printing medium conveying states in the printing apparatus 101 illustrated in FIG. 2.

In particular, FIGS. 6A to 6F indicate the state that the printing media are conveyed on the printing medium conveying route when the printing is performed using only the double-sided conveying route.

Incidentally, FIGS. 6A to 6F and FIGS. 7A to 7F show examples of the print job in which double-sided printed pages and single-sided printed pages are mixed. For example, pages P01, P02, P05, P06 and P09 correspond to the single-sided printed pages, and pages P03/P04 and P07/P08 correspond to the double-sided printed pages. Further, FIGS. 6B to 6F indicate printing medium conveying order according to printing order of the respective pages.

FIGS. 7A to 7F indicate the state that the printing media are conveyed on the printing medium conveying route when the printing is performed using the single-sided conveying route and the double-sided conveying route in the printing apparatus 101. Incidentally, FIGS. 7B to 7F indicate printing medium conveying order according to printing order of the respective pages.

Figure 8:
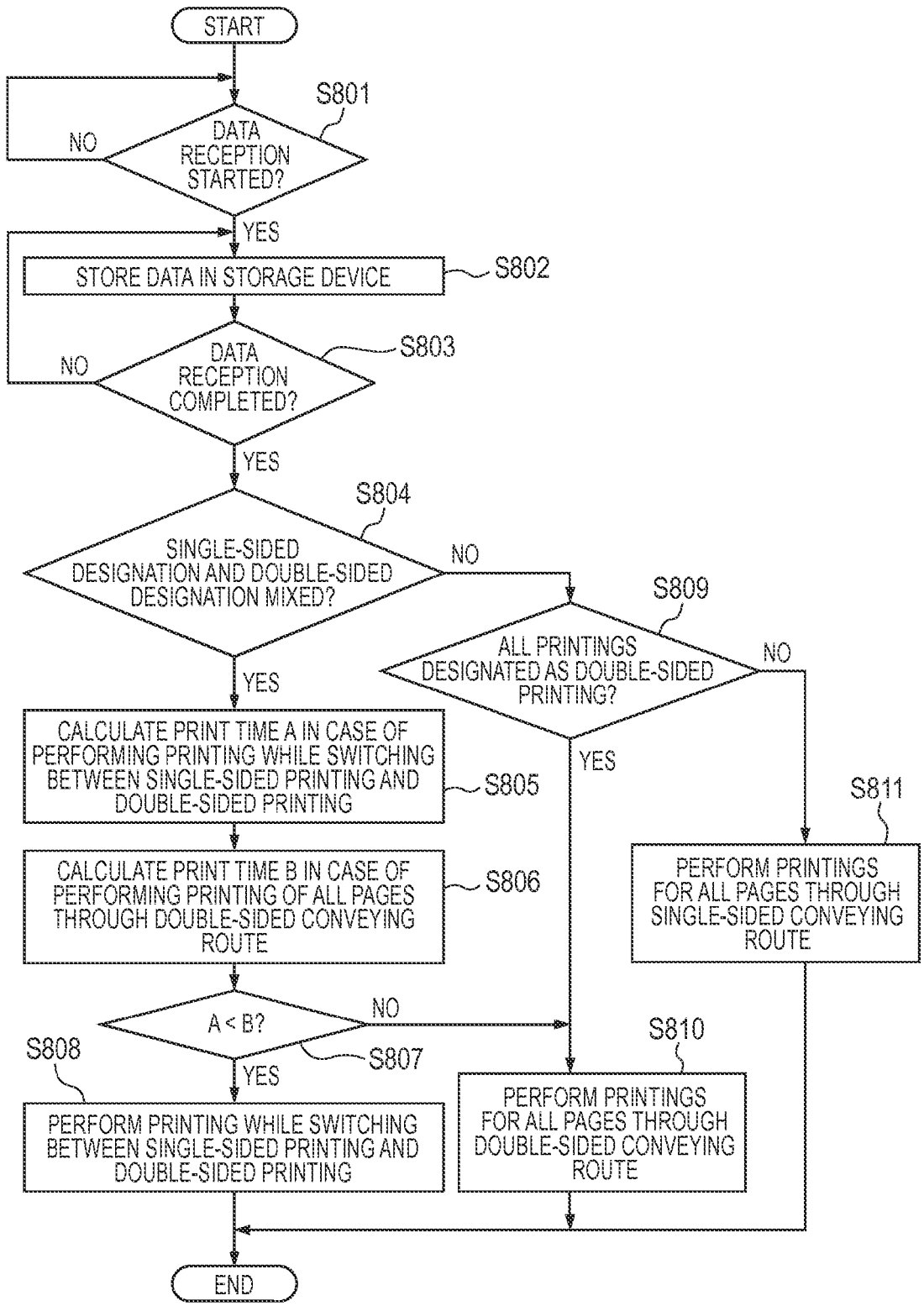
FIG. 8 is a flow chart for describing a control procedure by the printing apparatus.

FIG. 8 is a flow chart for describing a control procedure of the printing apparatus according to the present embodiment. Here, it should be noted that processes in respective steps of the flow chart are achieved when the CPU 305 loads the control program stored in the ROM 310 to the RAM 306 and thus executes the loaded program. Incidentally, in the present embodiment, to perform the printing for the double-sided printed pages and the single-sided printed pages in the job by using the double-sided conveying path is called a first printing process. On the other hand, to perform the printing for the double-sided printed pages and the single-sided printed pages in the job by switching the double-sided conveying path and the single-sided conveying path is called a second printing process.

When power is applied to the printing apparatus 101, the control unit 201 activates a step S801 being a control step to set a print data reception waiting state.

In the step S801, when it is judged by the CPU 305 of the control unit 201 that the print data is received from the PC 102 serving as the external device through the network 103, the flow advances to a step S802.

Then, in the step S802, the print data received from the PC 102 is stored in the RAM 306 or the HDD 311. Then, in a step S803, it is judged by the CPU 305 whether or not the storage process of the print data is completed for each job. When it is judged by the CPU 305 that the received print data could be stored in the RAM 306 or the HDD 311, the flow advances to a step S804.

Then, in the step S804, it is judged by the CPU 305 whether or not single-sided designation for the single-sided printing and double-sided designation for the double-sided printing are mixed in the setting of the print data stored in the RAM 306 or the HDD 311 in the step S802. More specifically, header information of the print data given as the setting by the PC 102 side is discriminated by the CPU 305, and it is judged based on the discriminated header information whether or not the single-sided designation and the double-sided designation are mixed. For example, the header information includes information indicating that, among the print data of ten pages, the double-sided printing has been designated for third and fourth pages and the single-sided printing has been designated for remaining pages by a user. When such header information is not given by the PC 102 side, pages of the print data may directly be analyzed by the CPU 305 to judge whether or not the single-sided designation and the double-sided designation are mixed. In any case, when it is judged by the CPU 305 that the single-sided designation and the double-sided designation are mixed in the print data, the flow advances to a step S805.

Then, in the step S805, a first print prediction time (print time A) which is necessary for the printing apparatus 101 to perform the printing by switching the single-sided printing and the double-sided printing is calculated by the CPU 305.

Next, in a step S806, a second print prediction time (print time B) in a case where the printings of all the pages included in the job are performed through the double-sided conveying route by the printing apparatus 101 is calculated by the CPU 305.

Then, in a step S807, it is judged by the CPU 305 whether or not the print time A is shorter than the print time B by comparing the first print prediction time calculated in the step S805 with the second print prediction time calculated in the step S806. Here, when it is judged by the CPU 305 that the first print prediction time is shorter than the second print prediction time, the flow advances to a step S808.

Then, in the step S808, the printing is performed by the printing apparatus 101 while the single-sided printing and the double-sided printing are switched by the CPU 305, and then the entire process in the flow chart ends.

On the other hand, when it is judged by the CPU 305 in the step S807 that the first print prediction time is longer than the second print prediction time, the flow advances to a step S810.

Then, in the step S810, the printings are performed by the printing apparatus 101 for all the pages included in the job through the double-sided conveying route, and then the entire process in the flow chart ends.

On the other hand, when it is judged by the CPU 305 in the step S804 that the single-sided designation and the double-sided designation are not mixed in the print data, the flow advances to a step S809.

Then, in the step S809, it is judged by the CPU 305 whether only the single-sided designation or only the double-sided designation is included in the print data. Here, when it is judged by the CPU 305 in the step S809 that only the double-sided designation is included in the print data, the flow advances to the step S810.

On the other hand, when it is judged by the CPU 305 in the step S809 that only the single-sided designation is included in the print data, the flow advances to a step S811.

Then, in the step S811, the printings are performed under the control of the CPU 305 for all the pages included in the job through the single-sided conveying route, and then the entire process in the flow chart ends.

As described above, when the present embodiment is applied to the job in which the single-sided page and the double-sided page are mixed, the user can perform the printing at optimum printing speed without being aware of a printing medium conveying method.

Second Embodiment

In the present embodiment, a more preferable operation to be performed in a case where, in the job in which the single-sided pages and the double-sided pages are mixed, the single-sided pages continue will be described.

Namely, in the present embodiment, the page configuration of the job is analyzed in advance, and then a process of dividing a page region into a single-sided page region (first region) in which the single-sided pages continue and a region (second region), other than the first region, in which the single-sided pages and the double-sided pages are mixed is performed. Then, the single-sided printing process is executed to the analyzed and divided first region, and the process in the first embodiment is applied to the second region.

Figure 9:
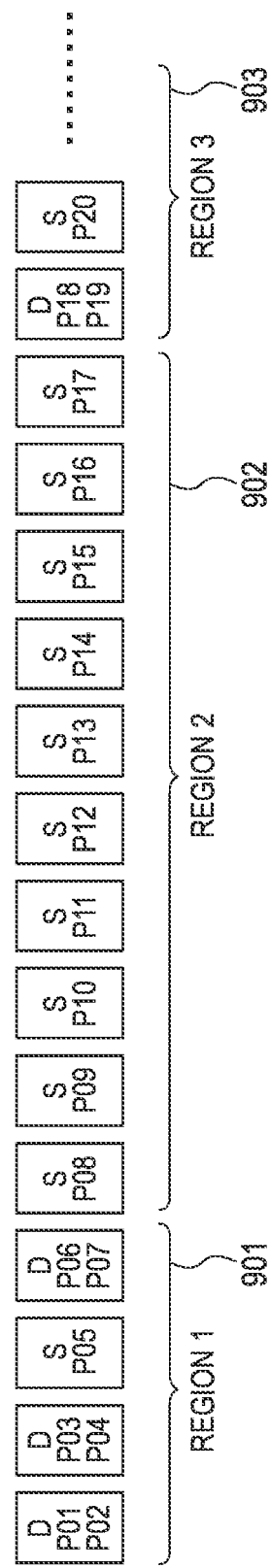
FIG. 9 is a diagram illustrating a page configuration which is included in a job to be processed by the printing apparatus.

FIG. 9 is a diagram illustrating the page configuration included in the job to be processed by a printing apparatus according to the present embodiment.

In FIG. 9, different controlling is executed to each of a region 1 indicated by 901, a region 2 indicated by 902 and a region 3 indicated by 903.

In the present embodiment, it is judged by the CPU 305 whether printing to be performed through the double-sided conveying route is faster according to the number of the continuous single-sided pages, by using an inequality $(Sp \times St) \times Sa + (Dp \times Dt) \times Da + (SDc \times SDt) + (DSc \times DSt) > (Dp+Sp) \times Dt$. Incidentally, the region 2 corresponds to the single-sided printing page region, and each of the regions 1 and 3 is the region which includes the double-sided printing page region. In the present embodiment, when the CPU 305 analyzes the job, the region is divided into the single-sided printing page region and other regions, and the first embodiment is applied to the divided other regions. As a result, it is controlled by the CPU 305 to execute the printing process by using only the double-sided conveying path or by switching between the double-sided conveying path and the single-sided conveying path, in regard to the divided other regions.

Incidentally, when transportation is performed to the above inequality to obtain a condition of Sp (the number of the single-sided pages included in the job), an inequality $Sp > (Dp \times Dt - Dp \times Dt \times Da - SDc \times SDt - DSc \times DSt)/(St \times Sa - Dt)$ is obtained.

When it is judged by the CPU 305 that the number of the continuous single-sided pages included in the job satisfies the inequality concerning the number Sp calculated as above, the division of the region as illustrated in FIG. 9 is performed.

That is, only when the number of the continuous single-sided pages included in the region 902 satisfies the above condition of the number Sp, the division for obtaining the regions 901 and 902 is performed.

Figure 10:
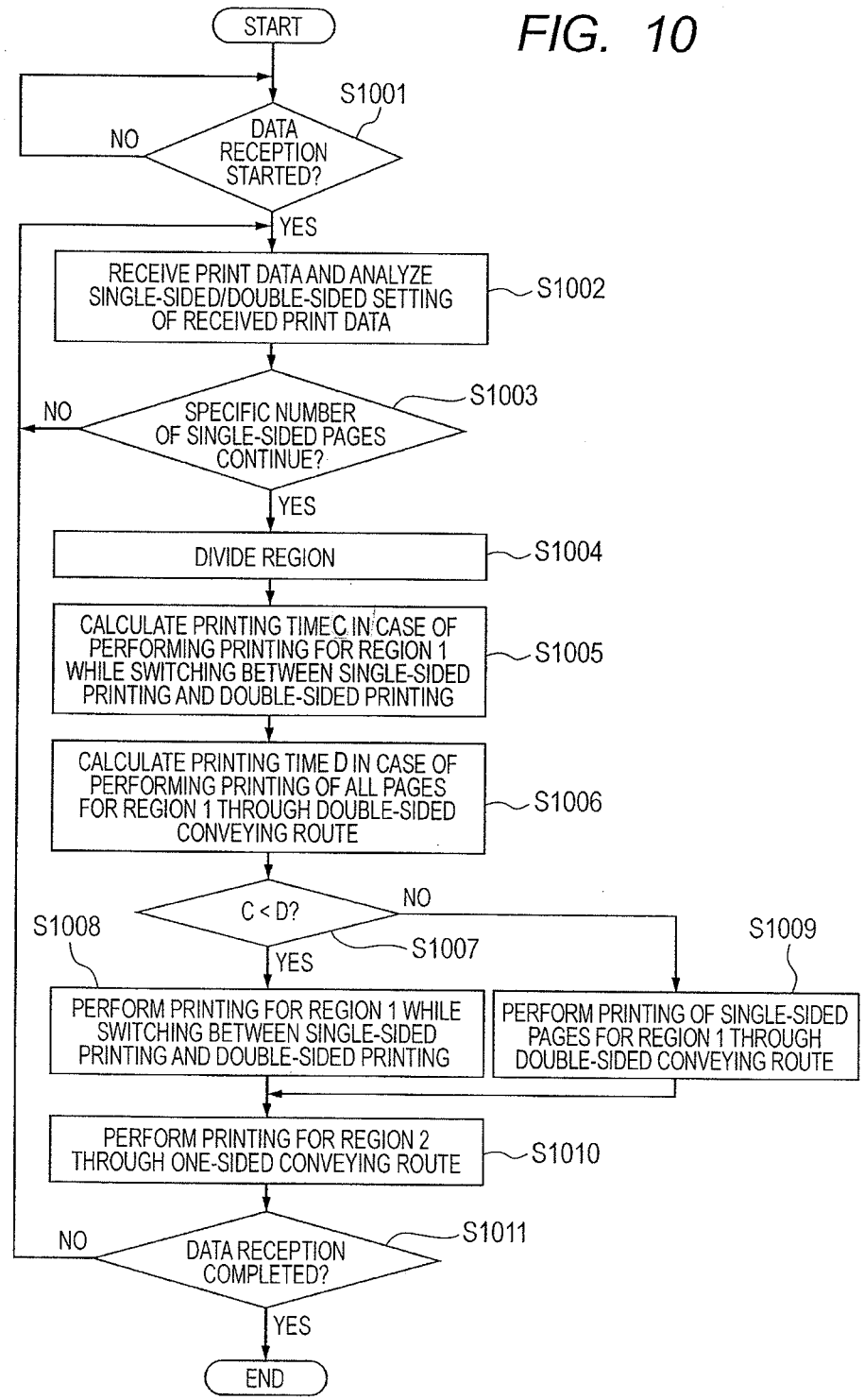
FIG. 10 is a flow chart for describing a control procedure by the printing apparatus.

FIG. 10 is a flow chart for describing a control procedure of the printing apparatus according to the present embodiment. Here, it should be noted that processes in respective steps of the flow chart are achieved when the CPU 305 loads the control program stored in the ROM 310 to the RAM 306 and thus executes the loaded program.

When power is applied to the printing apparatus 101, the control unit 201 activates a step S1001 being a control step to set a print data reception waiting state. In the step S1001, when it is judged by the CPU 305 of the control unit 201 that the print data is received from the external device through the network 103, the flow advances to a step S1002.

Then, in the step S1002, while the print data is being received, single-sided and double-sided designation commands included in the received print data are analyzed by the CPU 305. Then, on the basis the analyzed result in the step S1002, it is judged by the CPU 305 whether or not the number of the continuous single-sided pages reaches the number which satisfies the conditional expression illustrated in FIG. 9.

Only when it is judged by the CPU 305 in the step S1003 that the number of the continuous single-sided pages reaches the number which satisfies the conditional expression illustrated in FIG. 9, the flow advances to a step S1004.

Then, in the step S1004, the page region included in the print data is divided by the CPU 305 according to the dividing method described with reference to FIG. 9.

Then, in a step S1005, a third print prediction time taken to perform the printing to the divided anterior-half portion (region 901) by switching the single-sided printing and the double-sided printing is calculated by the CPU 305. Next, in a step S1006, a fourth print prediction time taken to perform the printing to the divided anterior-half region (region 901) through the double-sided conveying route is calculated by the CPU 305.

Then, in a step S1007, the third print prediction time (print prediction time C) calculated in the step S1005 and the fourth print prediction time (print prediction time D) calculated in the step S1006 are compared with each other by the CPU 305. When it is judged by the CPU 305 that the print prediction time C is shorter than the print prediction time D, the flow advances to a step S1008.

Then, in the step S1008, the CPU 305 controls to perform the printing to the region 901 by switching the single-sided printing and the double-sided printing, and the flow advances to a step S1010.

On the other hand, when it is judged by the CPU 305 in the step S1007 that the print prediction time C is longer than the print prediction time D, the flow advances to a step S1009. Then, in the step S1009, the CPU 305 controls to perform the printing for the single-sided copies to the region 901 through the double-sided conveying route, and the flow advances to the step S1010.

Subsequently, in the step S1010, the CPU 305 controls to perform the printing to the region 902 through the single-sided conveying route. Then, in a step S1011, it is judged by the CPU 305 whether or not all the print data in the job transmitted from the external device have been received. When it is judged by the CPU 305 that all the print data in the job have been received, the entire process in the flow chart ends.

On the other hand, when it is judged by the CPU 305 in the step S1011 that the print data not yet received exists in the job, the flow returns to the step S1002 to continue the data reception and analysis.

As described above, when the second embodiment is applied to the job in which the single-sided page and the double-sided page are mixed, the user can perform the printing at optimum printing speed without being aware of a printing medium conveying method.

In particular, the second embodiment of the present invention effectively operates to the job which includes the region which is set that the single-sided pages continue.

Third Embodiment

In the present embodiment, the first print prediction time calculated in the step S805 and the second print prediction time calculated in the step S806 both described in the first embodiment are obtained by measuring actual output time, and a printing medium conveying method is determined in a control method equivalent to that in the first embodiment. That is, the present embodiment corresponds to an example that the CPU 305 controls the printing process in response to print execution information held when printings of plural copies are performed or trial printing is performed.

Further, in the present embodiment, the third print prediction time calculated in the step S1005 and the fourth print prediction time calculated in the step S1006 both described in the second embodiment are obtained by measuring actual output time, and a printing medium conveying method is determined in a control method equivalent to that in the second embodiment.

Figure 11:
FIG. 11 is a diagram illustrating an example of a data format which is managed by the printing apparatus.

FIG. 11 is a diagram illustrating an example of a data format which is managed by the printing apparatus according to the present embodiment. It should be noted that this example corresponds to a data format example for storing, in the RAM 306, information (print execution information) concerning the printing medium conveying method determined by comparing the measurement result in the present embodiment with the measured value.

More specifically, the data format example in FIG. 11 shows an identifier 1101 for discriminating the region of the measured page, a page number 1102 for indicating a start page of the measured pages, a page number 1103 for indicating an end page of the measured pages, and information 1104 for indicating the printing medium conveying method determined based on the result judged in the step S807 or S1007.

In the present embodiment, when the printing of the same page group is performed plural times in the printings of plural copies or the trial printing, the third and following printings are performed using the printing medium conveying method based on the information 1104, whereby it is possible to perform the printing at optimum printing speed. For example, in a case where the print data set to be printed by plural copies is actually printed, when the printing of a first copy (first printing) is performed, the CPU 305 performs the printing by the printing method in the step S1005 to each of the page groups divided in the dividing method described with reference to FIG. 9. At this time, the CPU 305 measures the time from the printing start to the printing end by using a not-illustrated timer, and stores the measured time while associating it with the corresponding page group in the table illustrated in FIG. 11. When the printing of a second copy (second printing) is performed, the CPU 305 performs the printing by the printing method in the step S1006 to each of the page groups divided in the dividing method described with reference to FIG. 9. At this time, the CPU 305 measures the time from the printing start to the printing end by using the not-illustrated timer, and stores the measured time while associating it with the corresponding page group in the table illustrated in FIG. 11. Then, the CPU 305 controls to perform the printings of third and following copies according to the stored time information. More specifically, with respect to each of the page groups (regions) of the third and following print data, the CPU 305 compares the time from the printing start to the printing end for the first copy with the time from the printing start to the printing end for the second copy, and performs the printings to the third and following copies by the printing method of which the compared time is shorter. Thus, it is possible to perform the printings of the third and following copies at optimum printing speed. Incidentally, the first printing may be performed by the printing method in the step S1006, and the second printing may be performed by the printing method in the step S1005. Moreover, when there is the region in which the sheets to be subjected to the single-sided printing are printed by the number larger than a predetermined number as in the region 2 illustrated in FIG. 9, the CPU 305 may determine to perform the single-sided printing to the relevant region without performing any comparison.

The present invention is not limited to the above-described embodiments. Namely, the present invention is intended to cover various modifications (including organic combinations of the respective embodiments) included within the spirit and scope of the appended claims and not exclude them from the scope of the present invention Although the various examples and the embodiments of the present invention have been described as above, it is apparent for a person skilled in the art that the intent and the scope of the present invention are not limited to the specific description in the specification.

Other Embodiments

Aspects of the present invention can also be realized by a computer of a system or apparatus (or devices such as a CPU or MPU) that reads out and executes a program recorded on a memory device to perform the functions of the above-described embodiments, and by a method, the steps of which are performed by a computer of a system or apparatus by, for example, reading out and executing a program recorded on a memory device to perform the functions of the above-described embodiments. For this purpose, the program is provided to the computer for example via a network or from a recording medium of various types serving as the memory device (e.g., computer-readable medium).

While the present invention has been described with reference to the exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2010-151228, filed Jul. 1, 2010, which is hereby incorporated by reference herein in its entirety.

The invention claimed is:

1. A printing apparatus which can execute a job in which a double-Sided page and a single-sided page are mixed, by switching between a double-sided conveying path and a single-sided convey mg path, the apparatus comprising:
    a specifying unit configured to specify a print prediction time in a case where the job is executed by using a first printing process of printing the double-sided page and the single-sided page in the job by using the double-sided conveying path, and a print prediction time in a case where the job is executed by using a second printing process of printing the double-sided page and the single-sided page in the job by switching between the double-sided conveying path and the single-sided conveying path; and
    a control configured to execute the job by using, from either the first priming process or the second printing process, the printing process for which the print prediction time specified by the specifying unit is shorter.

2. An printing apparatus according to claim 1, further comprising a recognizing unit configured to recognize, by analyzing each page included in the job, a first page group in which the single-sided pages continue and a second page group in which the double-sided page and the single-sided page are mixed,
    wherein the specifying unit specifies, for the second page group recognized by the recognizing unit, the print prediction time in the case where the job is executed by using the first printing, process of printing the double-sided page and the single-sided page in the job by using the double-sided conveying path, and the print prediction time in the case where the job is executed by using the second printing process of printing the double-sided page and the single-sided page in the job by switching, between the double-sided conveying path and the single-sided conveying path, and
    the control unit executes the job by using, from either the first printing process or the second printing process, the printing process for which the print prediction time specified by the specifying unit is shorter to each page included in the second page group, and executes printing to each page included in the first page group by using the single-sided conveying path.

3. A printing apparatus according to claim 1 further comprising a holding unit configured to hold time information indicating a time taken for the control unit to execute the job by the first printing process and a time taken for the control unit to execute the job by using the second printing process,
wherein the control unit executes printing of plural copies according to the time information held by the holding unit.

4. A printing apparatus according to claim 1, further comprising a holding unit configured to hold time information indicating a time taken for the control unit to execute the job by using the first printing process and a time taken for the control unit to execute the job by using the second printing process,
wherein the control unit executes trial printing according to the time information held by the holding unit.

5. A control for controlling a printing apparatus which can execute a job in which a double-sided page and a single-sided page are mixed, by switching between a double-sided conveying path and a single-sided conveying path, the method comprising:
specifying a print prediction time in a case where the job is executed by using a first printing process of printing the double-sided page and the single-sided page in the job by using the double-sided conveying path and a print prediction time in a case where the job is executed by using a second printing process of printing the double-sided page and the single-sided page in the job by switching between the double-sided conveying path and the single-sided conveying path; and
controlling to execute the job by using, from either the first printing process or the second printing process, the printing process for which the specified print prediction time is shorter.

6. A non-transitory computer readable storage medium for storing a computer program to control a printing apparatus which can execute a job in which a double-sided page and a single-sided page are mixed, by switching between a double-sided conveying path and a single-sided conveying path, the computer program comprising:
a code to specify a print prediction time in a case where the job is executed by using a first printing process of printing the double-sided page and the single-sided page in the job by using the double-sided conveying path, and a print prediction time in a case where the job is executed by using a second printing process of printing the double-sided page and the single-sided page in the job by switching between the double-sided conveying path and the single-sided conveying path; and
a code to control to execute the job by using, from either the first printing process or the second printing process; the printing process for which the specified print prediction time is shorter.

* * * * *